(No Model.)
E. THOMSON.
SYSTEM OF ELECTRICAL DISTRIBUTION.
No. 468,122. Patented Feb. 2, 1892.
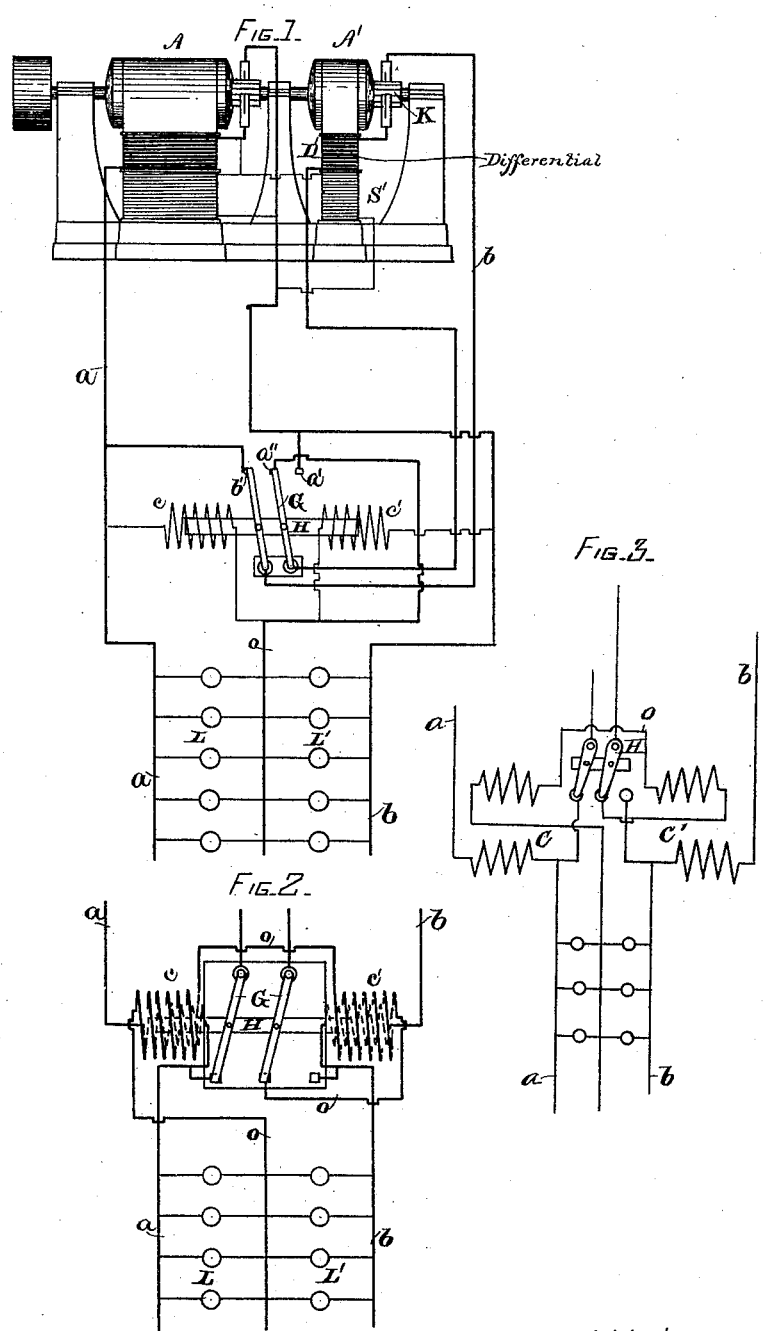

UNITED STATES PATENT OFFICE.

ELIHU THOMSON, OF SWAMPSCOTT, MASSACHUSETTS.

SYSTEM OF ELECTRICAL DISTRIBUTION.

SPECIFICATION forming part of Letters Patent No. 468,122, dated February 2, 1892.

Application filed March 11, 1891. Serial No. 384,661. (No model.)

*To all whom it may concern:*

Be it known that I, ELIHU THOMSON, a citizen of the United States, residing at Swampscott, in the county of Essex and State of Massachusetts, have invented a certain new and useful Improvement in Systems of Electric Distribution, of which the following is a specification.

My present invention relates to a system of electric distribution in which lamps or other translating devices are arranged in the well-known multiple-series fashion; and its purpose is to provide an effective means of maintaining a fairly equal potential on the different branches of the system, notwithstanding inequalities of load which may exist thereon.

The general way in which I accomplish this is by the use of a supplementary machine usually geared mechanically to the main generator, which is driven as a motor by the surplus energy shunted around the lightly-loaded side of the system and which therefore restores the energy to the main machine.

I do not, however, claim this, broadly, in the present application, for the present invention is directed toward means for automatically shifting the supplementary machine, which I term an "equalizer," from one branch of the system to the other, according as the major load changes. This enables the use of a single machine only for gaining the desired compensation under all conditions of service, and as I am the first to thus shift an energy-absorbing device returning the excess of energy to the electric-distribution system, my intention is to cover this feature, broadly, whether the special form of machine shown in the application be employed or other apparatus having the same equalizing function.

In the accompanying drawings, Figure 1 is a diagram of a system of distribution, showing my invention applied thereto. Fig. 2 represents a modified form of apparatus controlling the circuit connections of the equalizing-machine, and Fig. 3 is a diagram of the magnet-winding of Fig. 2.

In Fig. 1, A is the main generator, with its terminals connected to the outer mains $a\,b$ of the distribution system, and it may be compound wound, as shown, or otherwise arranged so as to maintain a constant potential between the mains. Between the intermediate wire (seen at $o$) and the outer mains are arranged multiple groups L L' of lamps or other translating devices. On the shaft of the main machine or geared to it by intermediate gearing there is a second armature A', revolving in a field excited by direct currents only or by shunt and direct, the latter being preferred. This second machine is designed to have its terminals coupled up in a shunt between the intermediate wire and one or the other of the outer mains, as will be explained hereinafter, and serves as the equalizer to maintain a balance on the system, as pointed out above.

In Fig. 1, K is the commutator of machine A'. S' is a field-coil connected in shunt across the outer mains and giving the field an initial constant excitation. A second coil D' on the field of machine A' is included directly in the shunt through commutator K and wound differentially to S', so that the field-magnetism and consequent counter electro-motive force of A' will be cut down proportionally to the amount of current flowing through the supplementary machine. Hence the work done by the motor will adjust itself automatically to the difference of load existing between the different branches of the distribution system, for an increase of current through the direct winding D', by cutting down the counter electro-motive force of the motor, increases the work done by it, as is well known, and consequently the amount of energy shunted or transferred by the equalizer. G is a switch having double arms permanently connected to the terminals of machine A', and this switch engages with contacts $a'\,a''\,b'$, thereby putting the intermediate wire $o$ in circuit with one or the other of the outer mains through commutator K, as will be apparent from the circuit connections shown. For throwing automatically the switch G to effect the desired compensation of the system it may be connected with armature H, whose ends project within two coils $c\,c'$, which are connected between the intermediate wire and the outer mains, respectively. The switch is shown in the drawing in the position it would occupy when L is the lighter load, and the excess of energy will then pass from the intermediate wire through one arm of the switch, thence through the machine A' back to the other arm of the switch, through contact $b'$, and finally to main $a$. Should the major load shift and $L'$ become the more lightly-loaded side, the potential between $o$ and $b$ would rise, so that the attractive effect due to coil $c'$ would overpower $c$ and the switch be automatically thrown to engage contacts $a'$ $a''$, with the result of putting $o$ in circuit with $b$ through the equalizing-machine, thus providing a shunt-path around the group $L'$, through which the excess of energy passes, as before, the circuit, if traced from the same pole of the main machine, as before, being from contact $a'$ through machine $A'$ in the same direction as before and thence back to contact $a''$ and intermediate wire $o$. Should no difference of load exist on the two sides $L L'$, then the switch may be allowed to remain inactive and not make contact with either side, the machine $A'$ being out of circuit. To this end suitable springs may be provided, if desired, to throw the core into its normal position; but when either side of the system becomes more heavily loaded than the other the switch is thrown automatically, so as to establish a shunt-circuit around the more lightly-loaded side. Sufficient current will then flow through machine $A'$ to maintain a balance, and the energy which this current represents is given back again to the distribution system by the action of the motor $A'$ helping to drive the main generator.

In Fig. 2 a modified arrangement for shifting the switch is shown depending for its action upon the differential effect between the current on the two sides of mains $a b$ and the middle-wire current. The magnet-coils $c c'$ are in this modification wound double—that is, with an inside and outside coil. The middle wire $o$ passes through one of the coils of which $c c'$ are made up in series or multiple, so that the current on this wire affects both coils. The second coil is included directly in the outer mains—that is, one of the coils of $c$ is included in the main $a$ and the other in the middle wire $o$, and likewise on the other side one of the coils of $c'$ forms part of main $b$, the other coil being in the middle wire, as before.

In Fig. 3, $l\ l'$ represent the windings included in the circuit of the middle wire, $r$ being the winding in main $a$, and $r'$ that in main $b$. The direction of winding of the magnet-coils $c c'$ is made such that when a difference of load exists the middle wire takes current in a direction to oppose or assist, as the case may be, the current passing in the direct coil and causes a shifting of the switch, so as to form a shunt around the lightly-loaded side, as in the case of Fig. 1. To accomplish this, the connections are such that when the left-hand side is the lightly-loaded side there shall be an assistance of the two currents flowing in $c'$, which retains the switch in the position shown; but when the other side becomes the lightly-loaded side a reverse current flows in the middle wire, so that the two currents in $c$ oppose and those in $c'$ assist, which will attract the core to the right, and the switch will be thrown over, so as to shunt the lightly-loaded side, as before.

If desired, the switching of the equalizing-machine from one side to the other may be effected manually; but I have described the above arrangement particularly, as in most cases it will be preferable to have the action entirely automatic.

What I claim as new, and desire to secure by Letters Patent, is—

1. The combination, in a multiple-series distribution system, of an equalizer coupled mechanically with the main generator and means for automatically shifting the equalizer from one side of the system to another to maintain the balance, as described.

2. The combination, in a multiple-series distribution system, of an electric motor connected with the main generator and means for automatically coupling said motor in shunt around one or another of the multiple groups to compensate for inequalities of load therein.

3. The combination, in a multiple-series distribution system, of an equalizer coupled mechanically with the main generator and adapted to be connected in shunt around one side of the system with a switch in the circuit of said equalizer and an actuator for the switch responsive to differences of potential upon the branches of the system.

4. The combination, in a multiple-series distribution system, of an equalizer coupled mechanically with the main generator and a switch for shifting the equalizer from one branch to another with magnets in circuit with the different branches and controlling the switch, as set forth.

5. The combination, in a multiple-series distribution system, of a motor adapted to serve as an equalizer maintaining the system balanced and a shifter for automatically shifting the motor from one branch of the system to another in accordance with differences of load thereon.

6. The combination, in a multiple-series distribution system, of a motor serving as an equalizer and coupled with the main generator and a switch for shifting the motor from one side of the system to another, as set forth.

ELIHU THOMSON.

Witnesses:
JOHN W. GIBBONEY,
BENJAMIN B. HULL.